United States Patent Office 3,726,821
Patented Apr. 10, 1973

3,726,821
WASH-RESISTANT ANTISTATIC COATING
COMPOSITIONS
Thomas T. Chiu, Midland, Mich., assignor to The Dow
Chemical Company, Midland, Mich.
No Drawing. Filed Dec. 23, 1968, Ser. No. 786,479
Int. Cl. C08f 33/08; C08g 49/04
U.S. Cl. 260—29.6 NR    8 Claims

ABSTRACT OF THE DISCLOSURE

Wash-resistant antistatic fibrous materials are prepared by (1) contacting a fibrous substrate with a novel wash-resistant antistatic composition comprising an aqueous dispersion of a polyamine such as polyethylenimine and an organic polysulfonium compound such as (2-butene-1,4-diyl)bis[bis(2-hydroxyethyl)sulfonium chloride] and (2) curing the antistatic composition to form an adherent, wash-resistant antistatic coating for the fibrous substrate.

BACKGROUND OF THE INVENTION

This invention relates to wash-resistant antistatic coatings for hydrophobic fibrous materials and a process for preparing wash-resistant antistatic fibers.

Rapid advances have been made during recent years in the development of synthetic organic resins imminently suitable for use in the production of synthetic filaments, fibers, yarns and fabrics possessing the important properties of high true elasticity, flexibility and high tensile strength, in conjunction with high dielectric strength, controlled shrinkage, and high resistance to water, alkalies and minerals and organic acids, thereby rendering them of outstanding merit in the production of textiles for a wide variety of uses. Illustrative of such resins include the polyesters, the polyacrylonitriles, the polyvinylchlorides, the polyolefins and others.

Unfortunately, these synthetic organic resins are particularly subject to the disadvantage that fibers, yarns or other articles made therefrom tend to develop an electrostatic charge upon their surfaces when they are subjected to friction during the production, and later during the processing, of the fibers, and especially during the service life of the finished article. In order to render fibrous materials of such resins substantially antistatic, it has been the practice in the art to treat fibrous materials of these synthetic organic resins with compositions which will prevent or reduce the accumulation of an electrostatic charge on the surfaces of articles made therefrom. It is very important that any treatment or additive employed shall provide continued protection against the development of such a static charge, and, at the same time, shall not substantially reduce the tensile strength, flexibility, elasticity, resistance to chemical, bacterial and other agencies, and other important properties of the resins so as to render the article unsuitable for the intended purpose. Heretofore, the prior art methods for accomplishing such ends have not provided the means whereby the treated article remains antistatic after repeated washings thereof with usual detergents such as soap and water.

In view of the substantial lack of success in preparing wash-resistant antistatic coatings for hydrophobic fibrous materials, it would be highly desirable to provide an antistatic composition which upon application to a fibrous material forms a wash-resistant antistatic coating for the fibrous material and a process for preparing wash-resistant antistatic fibrous materials.

SUMMARY OF THE INVENTION

In accordance with the present invention wash-resistant antistatic fibers of hydrophobic fibers are prepared by a process which comprises the steps of (1) contacting a hydrophobic fibrous substrate with an antistatic coating composition, hereinafter described in detail, comprising an aqueous dispersion of from about 0.5 to about 15 weight percent of a polyamine and from about 0.1 to about 20 weight percent of a water-dispersible organic polysulfonium compound, both percentages being based on the dispersion, and (2) then curing the antistatic composition to form an adherent, wash-resistant antistatic coating on the fibrous substrate. It is believed that upon subjecting the antistatic composition to curing conditions, the sulfonium and amine moieties react to form crosslinkages between the backbone chains of the polyamine and the polysulfonium compound. The crosslinked materials act as electroconductive cages which encompass the fibrous substrate and which are essentially wash-resistant. The novel compositions of this invention are particularly suitable for finishing textile materials made of nylon, polyolefin fibers, polyacrylonitrile fibers or polyester fibers, and their mixtures with each other or any other synthetic or natural hydrophobic fiber. These compositions are used primarily in treating loose material, yarns and knit goods, but may also be applied to woven goods. The excellent antistatic property which will remain after numerous washings is obtainable quantitatively even from relatively dilute aqueous dispersions.

DESCRIPTION OF THE PREFERRED EMBODIMENTS

In accordance with the process of this invention textile fibers are treated with a novel antistatic coating composition comprising an aqueous dispersion containing from about 0.5 to about 15 weight percent of a polyamine and from about 0.1 to about 20 weight percent of a water-dispersible organic polysulfonium compound, both percentages being based on the aqueous dispersion.

The suitable polyamines for the purposes of this invention are the polyalkene polyamines having at least 2 primary amine groups and at least 1 secondary amine group. The nitrogen atoms in such polyamines are linked by —$C_mH_{2m}$— groups, wherein $m$ is a small integer from 2 to 4, and the polyamine molecule has a molecular weight up to about 100,000. Polyalkylene polyamines which are mixtures of linear, branched and cyclic polyamines are entirely suitable for use in this invention. Accordingly, the term "polyamine" as employed herein and in the appended claims is intended to include the polyalkene polyamides in pure or relatively pure form, mixtures of such materials, and crude polyalkylene polyamines which are commercial products and may contain minor amounts of other compounds. Examples of suitable polyalkylene polyamines include the polyethylene polyamines, e.g., diethylenetriamine, triethylenetetramine, tetraethylenepentamine, pentaethylenehexamine, N-(2-aminoethyl)-piperazine, N,N-bis(2-aminoethyl)ethylenediamine, diaminoethyl triaminoethylamine, piperazinoethyl triethylenetetraamine and polyethylenimines having molecular weights up to 100,000; the corresponding polypropylene polyamines; and the corresponding polybutylene polyamines. The polyethylenimines are preferred.

Organic polysulfonium compounds, hereinafter described in detail, employable in the practice of this invention are water-dispersible organic compounds containing at least 2 sulfonium groups in the macromolecular structure. Suitable organic polysulfonium compounds may be monomer or polymer so long as the requirement of water dispersibility and the minimum requirement of 2 sulfonium groups per molecule are met. It is generally not possible to assign a specific value as a minimum required concentration of sulfonium groups in the polysulfonium molecule in which the value will be applicable to all operable polysulfonium compounds. Such a value is dependent on other variables such as the kind of sulfonium group, the kind of organic molecular base to which the sulfonium groups are attached, the molecular weight of the polysulfonium compound, the conditions used to disperse the compound, etc. In most instances a lower concentration of sulfonium groups may be present in a water-dispersible compound wherein the macromolecules also contain other kinds of polar groups, e.g., carboxy, hydroxyl, amino, amido, and the like, than may be necessary where the macromolecules are highly nonpolar except for the sulfonium groups. For the purposes of illustration and not limitation, a water-dispersible copolymer of monoethylenically unsaturated non-polar monomers and an alkenyl arylene methylene sulfonium monomer is characterized in that at least 60 mole percent of the polymerized moieties forming the copolymer are vinylidene polymerized forms of the sulfonium monomer.

The term "organic polysulfonium compound" is further characterized in that the compound contains at least 2 sulfonium moieties having the configuration

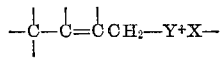

wherein

may be alkenylene or arylene, $Y^+$ is a divalent, sulfur containing, organic radical having its valences on the sulfur atom, said radical being derived from an organic sulfide having 2 to 8 carbon atoms, and $X^-$ is the counter anion. Illustratively, $Y^+$ is a sulfonium group which corresponds to the following formula:

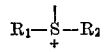

wherein $R_1$ separately represent monovalent radicals such as, for example, alkyls, haloalkyls, hydroxyalkyls, carboxyalkyls, acycloxyalkyls, carboalkoxyalkyls, carbamoylalkyls, alkylcarbamoylakyls, alkylamidoalkyls,

radicals wherein Z is selected from the group consisting of oxygen and sulfur, $a$ is an integer from 2 to 4, $b$ is at least 1, said monovalent radicals having from 1 up to 11 carbon atoms. Taken together, $R_1$, $R_2$, and S represent an alicyclic, saturated organic sulfide radical having from 4 to 6 ring carbon atoms which may contain such substituents as halogen, alkyl, amino, hydroxyl and the like groups.

Representative of the suitable polysulfonium compounds include the alkenylene methylene polysulfonium compounds, e.g. (2-butene-1,4-diyl)bis[bis(2-hydroxyethyl)sulfonium chloride], (2-butene-1,4-diyl)bis[dimethylsulfonium chloride], (2,4-hexadiene - 1,6 - diyl)bis(2-hydroxyethylmethylsulfonium chloride), (2,5-heptadiene-1,4,7-triyl)tris(diethylsulfonium chloride) and the like. By "alkenylene methylene polysulfonium compound" is meant a polysulfonium compound as described hereinbefore wherein the organic backbone of the polysulfonium compound has an alkylene bond in the beta position to each sulfonium group.

Preparation of an alkylene methylene polysulfonium compound is readily carried out by reacting the corresponding alkenylene methylene polyhalide with an organic sulfur containing compound in the presence or absence of a solvent or non-solvent liquid medium. Examples of organic sulfur containing compounds which suitablly react with the polyhalide include dimethyl sulfide, di-2-hydroxyethyl sulfide and the like.

Also suitable polysulfonium compounds include the aromatic polysulfonium compounds having an arylene bond in the beta position to each sulfonium group, for example, polymers of the following alkenyl arylene methylene sulfonium monomers:

vinylbenzyl(dimethyl)sulfonium chloride;
vinylbenzyl(di-2-hydroxyethyl)sulfonium chloride;
vinylbenzyl(2-hydroxyethyl, ethylbenzyl)sulfonium chloride;
vinylbenzyl(benzyl, methyl)sulfonium chloride;
vinylbenzyl(2-hydroxyethyl, carboxymethyl, sodium salt) sulfonium chloride;
vinylbenzyl(methyl, carboxymethyl)sulfonium chloride;
ar-vinylbenzyl(di-2-carboxyethyl)sulfonium chloride;
vinylbenzyl(methyl, carbomethoxy methyl)sulfonium chloride;
vinylbenzyl(methyl, 2-hydroxy-2-carboxyethyl, sodium salt)sulfonium chloride;
vinylbenzyl(di-2-carboxyethyl, potassium salt) sulfonium chloride;
vinylbenzyl(di-2-carbamylethyl)sulfonium chloride;
vinylbenzyl(methyl, carbamylmethyl)sulfonium chloride;
vinylbenzyl(benzyl, carboxymethyl)sulfonium chloride;
vinylbenzyl(methyl, 2-carbamylethyl)sulfonium chloride;
vinylbenzyl(2-hydroxyethyl, 2-carbamylethyl)sulfonium chloride;
vinylbenzyl(methyl, 2,3-dihydroxypropyl)sulfonium chloride;
vinylbenzyl(methyl, pentaethyleneglycol) sulfonium chloride;
vinylbenzyl tetrahydrothiophenium chloride;
vinylbenzyl(methyl, 2-hydroxyethyl)sulfonium chloride;

other alkenyl arylene methylene sulfonium monomers and the like sulfonium salts of alkenyl aromatic methylene chloride or bromide compounds. Polymers of the corresponding carbonates, oxalates, borates, nitrates, sulfates, etc. of the above are also suitable. Polymers of alkenyl arylene methylene sulfonium monomers which are also suitable polysulfonium compounds include copolymers of such sulfonium monomers and up to about 40 weight percent of other non-polar monomers copolymerizable therewith, e.g., styrene and other monovinylidene aromatic monomers, butadiene and other conjugated dienes, vinyl chloride, ethylene and other monoolefins, and the like. Other suitable polysulfonium compounds include copolymers of such sulfonium monomers and up to about 80 weight percent of various polar comonomers, e.g., acrylamide, acrylates and methacrylates, quaternary ammonium salts of alkenyl arylene methylene and alkenylene methylene halide polymers and the like. The molecular weight of the suitable polysulfonium compounds is not critical so long as the requirement of water-dispersibility is satisfied. Thus polymers having a molecular weight up to 100,000 or more and cross-linked polymers having molecular weights up to a million are found to be suitable.

Preparation of suitable alkenyl arylene methylene sulfonium monomers is readily carried out by reacting an organic halide having an alkenylene or arylene bond in the beta position to the halogen atom with an organic sulfur containing compound in the presence or absence of a solvent or non-solvent liquid medium. Examples of organic sulfur containing compounds include dimethylsulfide, ethylbenzyl(2-hydroxyethyl)sulfide and other organic sulfides having the configuration $R_1$—S—$R_2$ wherein $R_1$ and $R_2$ separately represent monovalent radicals defined previously in regard to the discussion of the polysulfonium compounds. A more complete description of methods for preparing the sulfonium monomers appears in U.S. Pat. 3,078,259. The polysulfonium compounds are produced by subjecting a sulfonium monomer or a mixture of such monomers alone or in combination with specified amounts of non-polar and/or polar monomers copolymerizable therewith to polymerization methods conventionally used with free radical catalyzed aqueous systems, i.e., mass-, emulsion-, and solution polymerization in the presence of actinic light, ultra-violet irradiation, gamma radiation and peroxides. Methods for preparation of the polysulfonium compounds are further described in U.S. Pat. 3,078,259 and U.S. Pat. 3,335,100.

Normally the above-described sulfonium groups or moieites of the polysulfonium compounds will have a halide counter anion such as the chloride anion. If desired, however, the halide form of the sulfonium group can be converted in a conventional manner to any one of the common anionic salt forms, e.g., by passing an aqueous dispersion of the water-dispersible polysulfonium compounds thru an anion exchange resin in the proper salt form. The counter anions which can be added in this manner include such organic and inorganic anions as bromide, fluoride, iodide, sulfate, nitrate, bicarbonate, carbonate, acetate, propionate, benzoate and the like. Other anions are dihydrogenphosphate, thiolate, succinate, oxylate and maleate.

An aqueous dispersion of a suitable polysulfonium compound and a suitable polyamine is readily prepared by charging the two components to an aqueous medium at room temperature or above with or without agitation.

The aqueous dispersion is applied to a fibrous substrate by a conventional technique, e.g., spraying, doctoring, wiping, dipping, soaking, etc. It is understood that the aqueous dispersion can be applied to the fibrous substrate before or after it is woven into a finished article.

Following application of the aqueous dispersion to the fibrous substrate, the aqueous dispersion is cured by drying the treated substrate at room temperature or by heating the treated substrate at temperatures up to about 100° C. Upon exposing the treated fibers to temperatures higher than 100° C., the fibers tend to lose their shape, soften, etc.

The following examples are given as illustrations of the invention and are not to be construed as limiting its scope. Throughout this specification and claims, all parts and percentages are by weight unless otherwise indicated.

Example 1

A sample of woven polypropylene carpet is soaked in an aqueous dispersion of 3 percent polyethylenimine having an average molecular weight of 75,000 and 1 percent of (2 - butene-1,4-diyl)bis[bis(2-hydroxyethyl)sulfonium chloride] for a period of 2 minutes at room temperature. The treated carpet sample is allowed to dry overnight at room temperature and 15 percent relative humidity. The treated carpet sample is then charged with static electricity and the exponential charge decay is monitored and recorded as shown in Table I. To show the wash resistance of the antistatic coating of polyethylenimine and polysulfonium compound, the treated carpet sample is washed, air dried and conditioned overnight at 15 percent relative humidity. The exponential charge decay of the washed sample is measured as above and is recorded in Table I.

In order to particularly point out the improved wash-resistance of the above antistatic coating over the wash-resistance of other conventional antistatic coatings, a second sample of the same polypropylene carpet is soaked in an aqueous dispersion of epichlorohydrin-modified polyethylenimine having a molar ratio of one epichlorohydrin to one ethylenimine and is then heated at 85° C. for 4 hours. The antistatic properties of the conventionally treated sample (A) are measured by the same method used above and are recorded in Table I for purposes of comparison.

Also for the purposes of comparison and to distinctly point out the advantages of this invention, the antistatic properties of a sample (C) of untreated polypropylene carpet are measured by the method used above and are also recorded in Table I.

TABLE I

| Example number | Antistatic coating composition | Exponential charge decay, sec.[1] | |
|---|---|---|---|
| | | Before Washing | After Washing[2] |
| 1 | Polyethylenimine-polysulfonium | 6 | 27 |
| A[3] | Epichlorohydrin-modified polyethylenimine | 9 | 4,800 |
| C[3] | None | >7,000 | >7,000 |

[1] A square inch sample is charged with static electricity using a rotating disk electrometer equipped with a high voltage corona discharge device. Relative humidity is maintained at 15% by a hygrometer which is tied in to a recorder-controller which regulates two streams of wet and dry air into a chamber which houses the electrometer. The charged potential on the specimen is sensed and continuously recorded, with magnitude of the charge on the sample being a function of the distance between the sample and the sensor. After the high voltage corona charging source is cut off, the time required to dissipate the charge on the sample to half of its initial level is measured.
[2] The sample is washed and rinsed in a rotary washing machine with a conventional detergent for a period of 15 minutes.
[3] Not an example of the invention.

Example 2

A sample of woven polypropylene carpet is soaked in an aqueous dispersion according to Example 1 except that the polysulfonium compound is a homopolymer of vinylbenzyl(di-2-hydroxyethyl)sulfonium chloride. The antistatic properties of the treated sample are measured before and after washing. Retention of antistatic properties after washing is similar to that observed in Example 1.

Several aqueous dispersions according to Example 1 except that different polysulfonium compounds, as hereinbefore described, are substituted for (2-butene-1,4-diyl)bis[bis(2-hydroxyethyl)sulfonium chloride] are applied to a sample of woven polypropylene carpet. The treated carpet samples exhibit antistatic properties similar to those observed in Example 1, even after repeated washing.

Aqueous dispersions according to Example 1 except that different polyamines, as hereinbefore described, are substituted for polyethylenimine are similarly applied to a woven sample of polypropylene fibers. Substantially the same antistatic properties are observed as those observed in Example 1.

Also several of the above-described aqueous dispersions are similarly applied to other fibrous materials, as hereinbefore described, and the samples are washed and tested for antistatic properties according to the procedure described in Example 1. The resulting antistatic coatings are found to have substantially the same resistance to washing as the antistatic coating of Example 1.

What is claimed is:

1. An antistatic coating composition capable of forming a wash-resistant antistatic coating for fibrous materials, said composition comprising an aqueous dispersion of from about 0.5 to about 15 weight percent of a polyalkylene polyamine having at least 2 primary amine groups and at least one secondary amine group wherein the nitrogen atoms of said amine groups are linked by —$C_mH_{2m}$— wherein $m$ is a small integer from 2 to 4 and a molecular weight up to about 100,000 and from about 0.1 to about 20 weight percent of a water-dispersible organic polysulfonium compound having at least two sulfonium moieties having the configuration

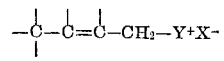

wherein

is alkylene or arylene; $Y^+$ is a sulfonium group represented by the formula

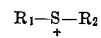

wherein $R_1$ and $R_2$ separately represent the monovalent radicals selected from the class consisting of alkyl, haloalkyl, hydroxyalkyl, carboxyalkyl, acycloxyalkyl, carboalkoxyalkyl, carbamoylalkyl, alkylcarbamoylalkyl, alkylamidoalkyl and $$-H\text{-}(C_aH_{2a}Z)_bC_aH_{2a}-$$

radical wherein Z is oxygen or sulfur, $a$ is an integer from 2 to 4, $b$ is at least 1, said monovalent radicals having from 1 to 11 carbon atoms; and X is a counter anion, said polysulfonium compounds having a carbon-to-carbon double bond in the beta position to each of the sulfonium groups.

2. An antistatic coating composition comprising an aqueous dispersion of from about 0.5 to about 15 weight percent of a polyalkylene polyamine having at least 2 primary amine groups and at least one secondary amine group wherein the nitrogen atoms of said amine groups are linked by $-C_mH_{2m}-$ groups wherein $m$ is a small integer from 2 to 4, said polyamine having a molecular weight up to 100,000 and from about 0.1 to about 20 weight percent of a water-dispersible organic polysulfonium compound selected from the group consisting of (2-butene-1,4-diyl)bis(bis(2-hydroxyethyl)sulfonium salt), (2-butene-1,4-diyl)bis(dimethylsulfonium salt), (2,4-hexadiene-1,6-diyl)bis(2-hydroxyethylmethylsulfonium salt), (2,5-heptadiene-1,4,7-triyl)tris(diethylsulfonium salt), polymers of vinylbenzyl(dimethyl)sulfonium salt, of vinylbenzyl(di-2-hydroxyethyl)sulfonium chloride, of vinylbenzyl(2-hydroxyethyl, ethylbenzyl)sulfonium salt, of vinylbenzyl(benzyl, methyl)sulfonium salt, of vinylbenzyl(2-hydroxyethyl, carboxymethyl, sodium salt)sulfonium salt, of vinylbenzyl(methyl, carboxymethyl)sulfonium salt, of ar-vinylbenzyl(di-2-carboxyethyl)sulfonium salt, of vinylbenzyl(methyl, carbomethoxymethyl)sulfonium salt, of vinylbenzyl(methyl, 2-hydroxy-2-carboxyethyl, sodium salt)sulfonium salt, of vinylbenzyl(di-2-carboxyethyl, potassium salt)sulfonium salt, of vinylbenzyl(di-2-carbamylethyl)sulfonium salt, of vinylbenzyl(methyl, carbamylmethyl)sulfonium salt, of vinylbenzyl(benzyl, carboxymethyl)sulfonium salt, of vinylbenzyl(methyl, 2-carbamylethyl)sulfonium salt, of vinylbenzyl(2-hydroxyethyl, 2-carbamylethyl)sulfonium salt, of vinylbenzyl(methyl, 2,3-dihydroxypropyl)sulfonium salt, of vinylbenzyl(methyl, pentaethyleneglycol)sulfonium salt, vinylbenzyl tetrahydrothiophenium salt, of vinylbenzyl(methyl, 2-hydroxyethyl)sulfonium salt; wherein the salt is selected from the group consisting of the chloride, bromide, carbonate, oxalate, borate, nitrate and sulfate of said polysulfonium compound.

3. The composition according to claim 2 wherein the polysulfonium compound is a polymer of an alkenyl arylene methylene sulfonium monomer.

4. The composition according to claim 3 wherein the sulfonium monomer is vinylbenzyl(di-2-hydroxyethyl) sulfonium chloride.

5. The composition according to claim 1 wherein the polyalkylene polyamine is polyethylenimine.

6. A composition according to claim 1 wherein the polyamine is polyethylenimine and the polysulfonium compound is (2-butene-1,4-diyl)bis(bis(2-hydroxyethyl) sulfonium chloride).

7. The composition according to claim 1 wherein the polysulfonium compound is an alkenylene methylene polysulfonium compound having at least two alkenylene methylene moieties.

8. The composition according to claim 2 wherein the polyamine is selected from the group consisting of diethylene triamine, triethylenetetramine, tetraethylenepentamine, pentaethylenehexamine, N-(2-aminoethyl) piperazine, N,N-bis(2-aminoethyl)ethylenediamine, diaminoethyl triaminoethylamine, piperazinoethyl, triethylenetetramine; and polyethylenimines, polypropylenimines, and polybutylenimines, said imines having molecular weights up to 100,000.

References Cited
UNITED STATES PATENTS

| | | | |
|---|---|---|---|
| 2,676,896 | 4/1954 | Cohen | |
| | | | 260—Anti-static digest (UX) |
| 2,700,001 | 1/1955 | Cohen | 117—139.5 R |
| 3,271,496 | 9/1966 | Michaels | 260—29.6 WU |
| 3,309,223 | 3/1967 | Owen | 117—139.5 R |
| 3,335,100 | 8/1967 | Geyer | 260—2.1 E |
| 3,453,242 | 7/1969 | Schmitt | 260—29.6 HN (UX) |

LORENZO B. HAYES, Primary Examiner

J. B. LOWE, Assistant Examiner

U.S. Cl. X.R.

260—29.6 N, DIG 15; 117—39.5 A